United States Patent
Ohta et al.

[11] Patent Number: 5,414,786
[45] Date of Patent: May 9, 1995

[54] OPTICAL WAVEGUIDE COMPONENT WITH A MOLDED RESIN PORTION HAVING ACCURATELY ALIGNED GUIDE PIN HOLES THEREIN

[75] Inventors: Toshihiko Ohta; Takashi Shigematsu; Takeo Shimizu; Shiro Nakamura, all of Tokyo, Japan

[73] Assignee: The Furukawa Electric Co., Ltd., Tokyo, Japan

[21] Appl. No.: 132,138

[22] Filed: Oct. 4, 1993

[30] Foreign Application Priority Data

Oct. 9, 1992 [JP] Japan .................................. 4-271511

[51] Int. Cl.⁶ .............................................. G02B 6/38
[52] U.S. Cl. ...................................... 385/63; 385/129
[58] Field of Search ................... 385/63, 78, 60, 88, 385/89, 114, 115, 116, 120, 53, 130, 131, 129, 132

[56] References Cited

U.S. PATENT DOCUMENTS

| | | | |
|---|---|---|---|
| 4,401,361 | 8/1983 | Slaughter | 385/114 |
| 5,067,830 | 11/1991 | McAlpine et al. | 385/114 |
| 5,121,459 | 6/1992 | Chiang | 385/114 |

FOREIGN PATENT DOCUMENTS

| | | | |
|---|---|---|---|
| 0458608A1 | 11/1991 | European Pat. Off. | |
| 62-136615 | 6/1987 | Japan | 385/114 |
| 2-71207 | 3/1990 | Japan | 385/114 |

OTHER PUBLICATIONS

Bloem et al; "Fiber–Optic Coupler"; IBM Technical Disclosure Bulletin; vol. 16, No. 1; Jun. 1973; pp. 146–147.
Patent Abstracts of Japan, vol. 14, No. 72 (P–1004) Feb. 9, 1990 & JP–A–01 291 204 (Furukawa Electric Co.).
Patent Abstracts of Japan, vol. 14, No. 585 (P–1148) Dec. 27, 1990 & JP–A–02 251 918 (Sumitomo Electric).
Patent Abstracts of Japan, vol. 12, No. 163 (P–703) May 18, 1988 & JP–A–62 276 513 (Sumitomo Electric).

*Primary Examiner*—Rodney B. Bovernick
*Assistant Examiner*—John Ngo
*Attorney, Agent, or Firm*—Frishauf, Holtz, Goodman & Woodward

[57] ABSTRACT

An optical waveguide component which has end faces to be connected with optical fiber connectors by means of guide pins, comprises an optical waveguide component body having an optical waveguide core portion, and a resin mold cladding portion covering all the faces of the optical waveguide component body except for the end faces of the optical waveguide component body. Each end face of the resin mold portion has guide pin holes which were formed with the optical waveguide core portion being used as a positioning reference. Since the guide pin holes for connection with the optical fiber connectors are formed in the resin mold portion which, preferably has some elasticity and which covers the optical waveguide component body, the guide pin holes and a substrate are not broken even if subjected to a load after connection.

14 Claims, 6 Drawing Sheets

OPTICAL WAVEGUIDE COMPONENT WITH A MOLDED RESIN PORTION HAVING ACCURATELY ALIGNED GUIDE PIN HOLES THEREIN

BACKGROUND OF THE INVENTION

1. Field of the Invention

The present invention relates to an optical waveguide component used with optical fiber connectors connected to the end faces thereof, and more particularly, to an optical waveguide component used with optical fiber connectors connected thereto without alignment.

2. Description of the Prior Art

An optical waveguide component, which has an optical waveguide core portion of a predetermined pattern embedded in a cladding portion, is used with single- or multi-core optical fiber connectors connected to both end faces thereof.

There are two methods for connecting the optical fiber connectors. In one method, the end face of each optical fiber connector is butted to an end face of the optical waveguide component, the respective optical axes of optical waveguide cores are aligned individually with those of optical fibers, and thereafter, the connector and the component are fixed by bonding or welding. The other method is a non-alignment connecting method, which will be described below.

The non-alignment connection is applied to an optical waveguide component, such as the one shown in FIG. 1, for example.

In an optical waveguide component A, as shown in FIG. 1, an optical waveguide core portion 2 is formed on an optical waveguide substrate 1, such as a silicon substrate with a predetermined thickness. The core portion 2, which comprises of optical waveguide cores 2a of quartz glass arranged at predetermined pitches in the crosswise direction of the substrate 1, is embedded in a cladding portion 3 of quartz glass (with a lower refractive index than that of the core material).

Two grooves 3a and 3a, which have a predetermined width and depth and extend in the lengthwise direction of the substrate 1, are marked in the cladding portion 3 and the substrate 1, ranging from the top of the cladding portion to the near portion of the bottom of the substrate, by means of a dicer, for example. In doing this, the optical waveguide core portion 2 is used as a positioning reference.

Guide pins 4a and 4b with a predetermined diameter are arranged in the grooves 3a and 3a, respectively, and the whole resulting structure is pressed by means of a hold-down plate 5 so that the pins 4a and 4b are fixed in the grooves 3a and 3a.

On the other hand, optical fiber connectors 6 each contain optical fibers which are arranged at the same pitches as the cores 2a of the core portion 2 of the optical waveguide component A. Further, pin holes 6a and 6b are formed on either side of the connectors 6 so as to be coaxial with the guide pins 4a and 4b, respectively.

In connecting each optical fiber connector 6 to the optical waveguide component A, the guide pins 4a and 4b are inserted into the pin holes 6a and 6b, respectively, of the connector 6, and the respective end faces of the component A and the connector 6 are brought into contact with each other. Then, the component A and the connector 6 are pressed against each other by means of, for example, a spring clip 7.

Thereupon, the respective optical axes of the cores 2a of the optical waveguide core portion 2 are individually in alignment with the optical fibers of the optical fiber connector 6. Thus, the optical connection is completed without requiring an alignment operation.

According to the non-alignment connecting method described above, however, cracks may possibly be caused at the junction between the optical waveguide component A and the optical fiber connector 6, in the vicinity of the grooves 3a and 3a of the component A, as the guide pins are inserted or removed, or if the smallest load is applied on the junction after the component A and the connector 6 are connected.

The grooves 3a and 3a of the optical waveguide component A are cut in the top face of the cladding portion 3 to a depth such that they can receive the guide pins 4a and 4b, respectively. If the substrate 1 is about 1 mm thick, for example, the depth of the grooves 3a and 3a in the substrate is great relative to the thickness of the substrate, so that the strength of the substrate may be lowered in some cases.

In an optical waveguide component designed so that the pattern of the cores 2a of the optical waveguide core portion 2 is freely formed in a two-dimensional expanse, the two-dimensional core pattern sometimes may be cut into pieces as the grooves 3a and 3b are formed. Avoiding this situation entails an increase in cost for groove cutting or in the overall size of the optical waveguide component A.

SUMMARY OF THE INVENTION

An object of the present invention is to provide an optical waveguide component in which grooves for guide pins for the connection of optical fiber connectors are formed without cutting a cladding portion or a substrate so as to range from the top of the cladding portion to the substrate.

Another object of the present invention is to provide an optical waveguide component in which cracks, breakage, etc. cannot be easily caused in the vicinity of a substrate or guide pin holes of the component if a load is applied to the junction between the component and an optical fiber connector after they are connected.

Still another object of the present invention is to provide an optical waveguide component in which guide pin holes can be formed without damaging an optical waveguide core portion with a two-dimensional expanse, if any, in the component.

In order to achieve the above objects, according to the present invention, there is provided an optical waveguide component which has end faces to be connected with optical fiber connectors by means of guide pins, comprising: an optical waveguide component body formed having an optical waveguide core portion; and a resin mold portion formed covering all the faces of the body except the end faces, each end face of the resin mold portion being formed having guide pin holes with the optical waveguide core portion used as a positioning reference.

A method for manufacturing an optical waveguide component comprises forming an optical waveguide component body by forming a cladding portion on the surface of a substrate and then bonding and fixing a hold-down plate member on the cladding portion or the back of the substrate, the cladding portion having an optical waveguide core portion embedded therein; forming marker portions on the hold-down plate member of the optical waveguide component body with the optical waveguide core portion used as a positioning reference; injecting a molding resin into a mold after loading the optical waveguide component body into the mold, the mold having cores for guide pins arranged with the marker portions used as positioning references; and taking out the resulting cast (i.e. molded) article from the mold and removing the cores, thereby forming guide pin holes in each end face of a resin mold portion covering all the faces of the optical waveguide component body except for both end faces thereof.

Another method for manufacturing an optical waveguide component comprises arranging guide pins and optical fiber ferrules, having optical fibers set therein, at the upper portion of a mold so as to be positioned with respect to one another, the mold having at least three pin rods capable of fine motion at the bottom thereof; placing an optical waveguide component body, having an optical waveguide core portion embedded therein, on the at least three pin rods in a manner such that the end faces of the optical waveguide core portion are opposed to the respective end faces of the optical fiber ferrules; injecting a molding resin into the mold after finely adjusting the motion of the pin rods to align the optical waveguide core portion with the optical fibers in the optical fiber ferrules; and taking out the resulting cast (molded) article from the mold and removing the guide pins, thereby forming guide pin holes in each end face of a resin mold portion covering all the faces of the optical waveguide component body except for both end faces thereof.

DETAILED DESCRIPTION OF THE INVENTION

In an optical waveguide component according to the present invention, all the faces of its body except both end faces which are to be connected with optical fiber connectors, that is, the top and bottom faces and both side faces, are encapsulated in an elastic resin, thus forming a resin mold portion. Each end face of this resin mold portion is formed having guide pin holes, which are positioned with reference to an optical waveguide core portion of the optical waveguide component.

In connecting an optical fiber connector to the optical waveguide component, guide pins are inserted individually into the guide pin holes, and an end face of the component body and the end face of the connector are butted, with the guide pins in pin holes of the connector. Then, the component body and the connector are pressed against and fixed to each other by means of, for example, a spring clip.

Figure 1:
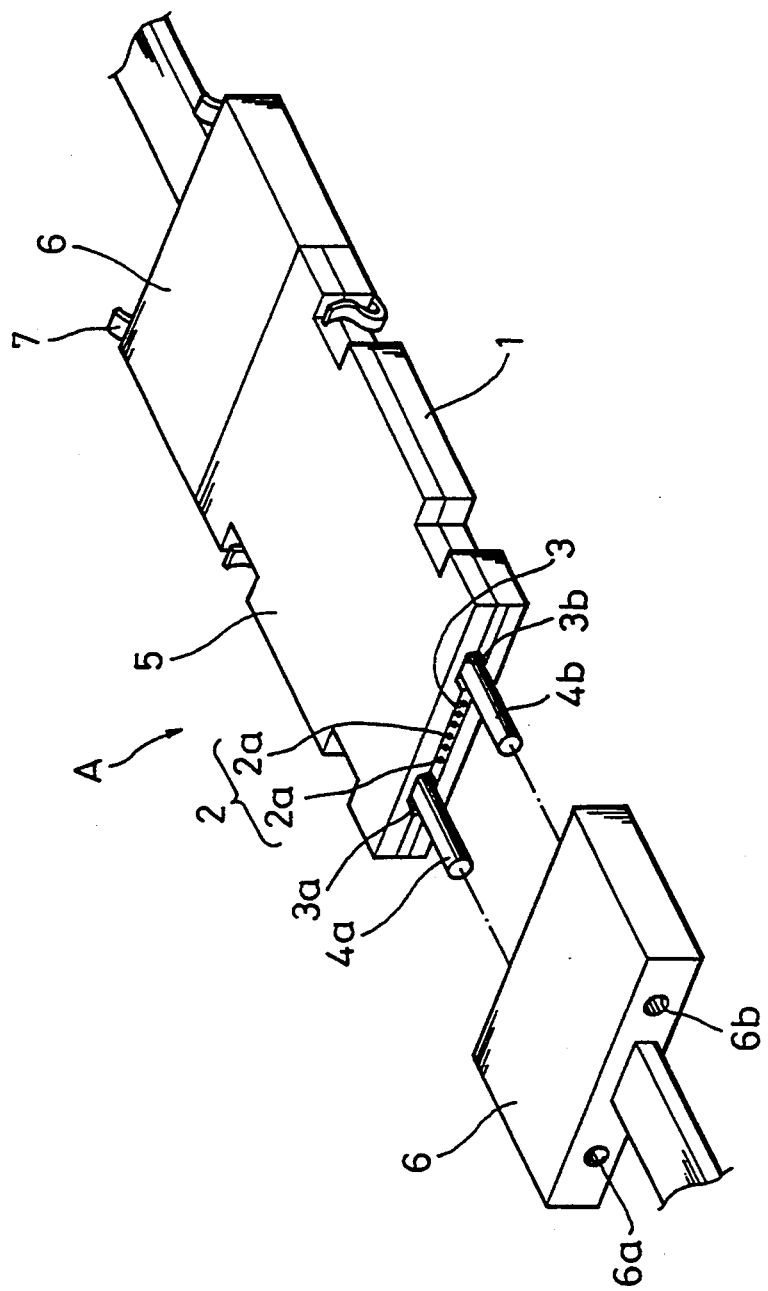
FIG. 1 is a perspective view illustrating the way optical fiber connectors are connected to a conventional optical waveguide component.

Thus, in the optical waveguide component according to the present invention, a substrate 1 is not engraved with the deep grooves 3a and 3a which are provided for the case shown in FIG. 1, so that its strength is not low. Further, the resin mold portion, which is formed having the guide pin holes, is so elastic that it can absorb a load, if any, acting on the junction between the component and the connector after their connection. As a result, the substrate and the guide pin holes can be restrained from being cracked or broken.

In forming the guide pin holes in the resin mold portion, moreover, references for positioning the holes in a resin molding process should only be marks on the surface of a hold-down plate member, and need not be deep grooves in the upper surface of a cladding, such as the ones required in the conventional case. Even though the optical waveguide core portion is a two-dimensional pattern, therefore, there is no possibility of its being cut into pieces, so that the size of the optical waveguide component can be reduced correspondingly.

The following is a detailed description of illustrative embodiments of the optical waveguide component and a manufacturing method therefor according to the present invention.

Embodiment 1

Figure 2:
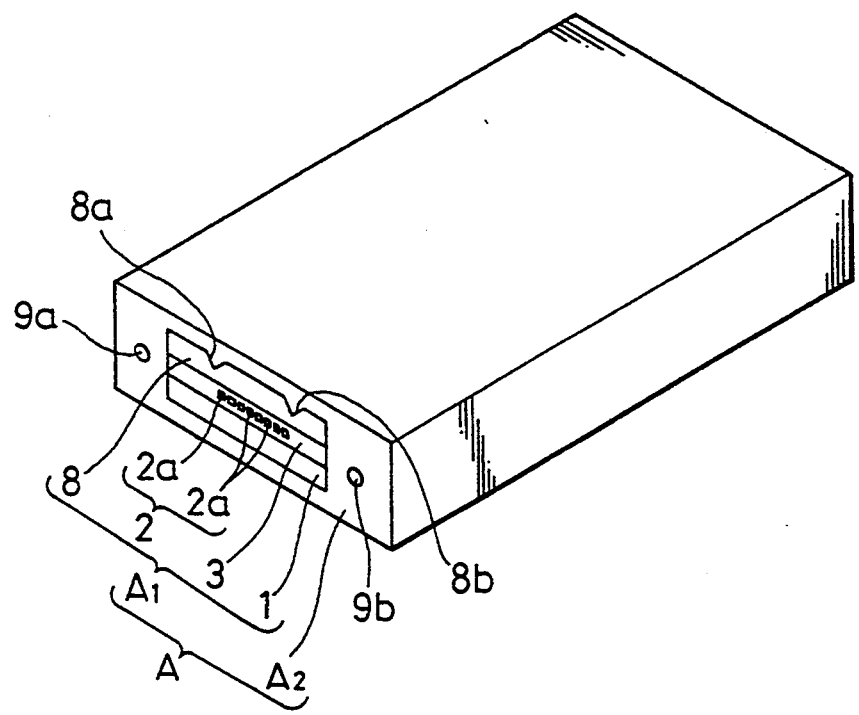
FIG. 2 is a perspective view showing an optical waveguide component according to the present invention.

FIG. 2 is a perspective view showing an embodiment of the optical waveguide component according to the present invention.

In FIG. 2, an optical waveguide component A comprises an optical waveguide component body A1 and a resin mold portion A2 which covers all the faces of the body A1 except the end faces.

The optical waveguide component body A1 includes a substrate 1 formed of e.g. silicon, a cladding portion 3 overlying the substrate, and an optical waveguide core portion 2 comprised of cores 2a which are embedded in the cladding portion 3 and arranged at predetermined pitches on the end faces. A hold-down plate member, e.g., a quartz glass plate 8 with a desired thickness, is bonded to the upper surface of the cladding portion 3 by means of an adhesive.

Two V-grooves 8a and 8b with a suitable depth are cut in the upper surface of the quartz glass plate 8 using the optical waveguide core portion 2 as a positioning reference. The grooves 8a and 8b serve as positioning references or marker portions for guide pin holes (described below) in a resin molding process.

Guide pin holes 9a and 9b with a predetermined diameter and length are formed in each end face of the resin mold portion A2 which covers the optical waveguide component body A1.

In connecting an optical fiber connector to the optical waveguide component A of FIG. 2, guide pins are inserted individually into the guide pin holes 9a and 9b, and the remaining parts of the guide pins are inserted into pin holes formed in the end face of the connector, corresponding in position to the guide pin holes 9a and 9b, so that the connector and the component are butted.

The guide pin holes 9a and 9b are formed using the V-grooves 8a and 8b as their positioning references, while the grooves 8a and 8b are cut using the optical waveguide core portion 2 as their positioning reference. Equivalently, therefore, the guide pin holes 9a and 9b are formed with the optical waveguide core portion 2 used as their positioning reference. Thus, each of optical fibers of the optical fiber connector and its corresponding core 2a of the core portion 2 are connected to each other with their respective optical axes in alignment.

The optical waveguide component A can be manufactured in the following manner.

Figure 3:
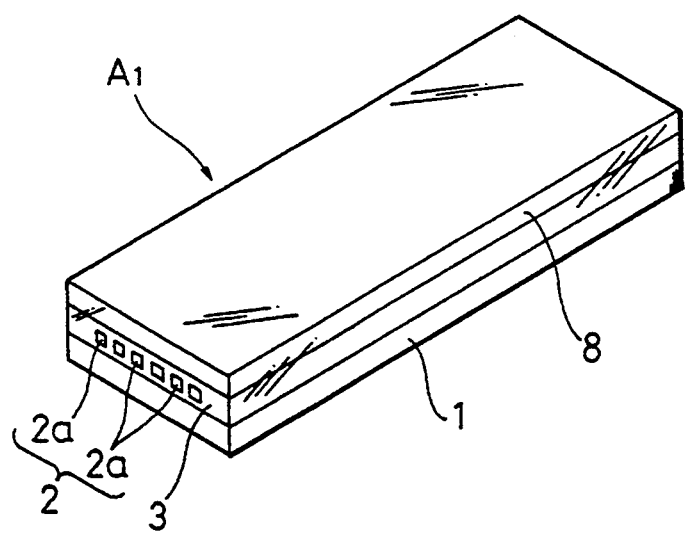
FIG. 3 is a perspective view showing an optical waveguide component body of the invention.

First, the cladding portion 3 of e.g. quartz glass and the optical waveguide core portion 2 therein are formed on the surface of the substrate 1 by a conventional method, as shown in FIG. 3. Then, the quartz glass plate 8, for use as the hold-down plate member, is bonded and fixed to the cladding portion 3 by means of a adhesive such as, for example, heat resisting epoxy resin. In this case, the thickness of the glass plate 8 may be adjusted to any suitable value. For example, it may be about 0.5 mm if the thicknesses of the substrate 1 and the cladding portion 3 are about 1 mm and 50 μm, respectively.

Subsequently, the two V-grooves 8a and 8b are cut in the upper surface of the quartz glass plate 8 using the optical waveguide core portion 2 as the positioning reference, by means of a dicer or other machining means. Since the V-grooves are used as the positioning references for the guide pin holes in the resin molding process (mentioned later), it is necessary only that the positional relation with the core portion 2 be indicated. Thus, the V-grooves should only be shallow enough not to reach the upper surface of the cladding portion 3, for example.

Figure 5:
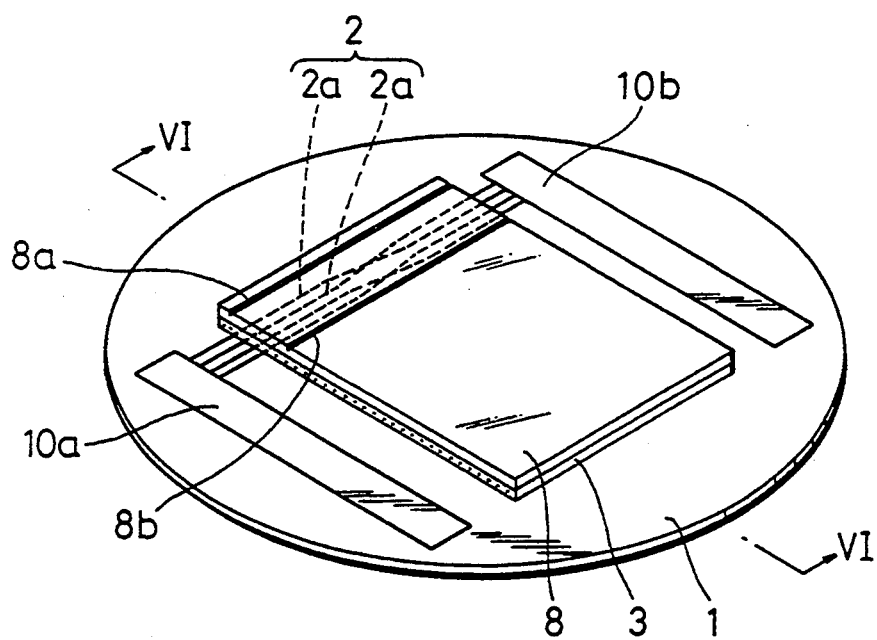
FIG. 5 is a perspective view showing a method for manufacturing the optical waveguide component body of the invention directly on a silicon wafer (substrate)
Figure 6:
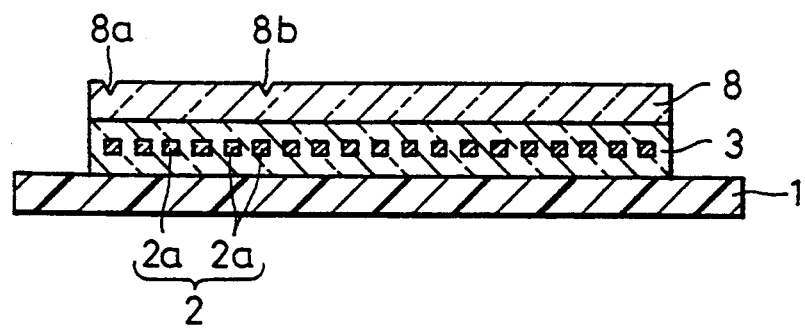
FIG. 6 is a sectional view taken along line VI—VI of FIG. 5.

The optical waveguide component body A1 is manufactured in the following manner. This manufacturing method will be described with reference to FIG. 5 and the sectional view of FIG. 6 taken along line VI—VI of FIG. 5.

The cladding portion 3, which has the optical waveguide core portion 2, comprising the cores 2a, embedded therein, is formed on the substrate 1, such as a silicon wafer, by the conventional flame deposition method.

In doing this, no cladding is formed on some of the cores 2a of the optical waveguide core portion 2 with respect to the lengthwise direction so that the core portion 2 can indicate its own position.

Then, the quartz glass plate 8 as the hold-down plate member, having a thickness of e.g. 1 mm, is pasted on the whole surface of the cladding portion 3 by means of a thermosetting adhesive.

Thereafter, the two V-grooves 8a and 8b, which extend in the lengthwise direction of the optical waveguide core portion 2 and have a depth of about 0.2 mm, are cut as marker portions in the surface of the quartz glass plate 8 using some of the cores of the core portion 2, which are visible through the plate 8, as references. The depth of the V-grooves 8a and 8b may be adjusted by utilizing height-direction markers 10a and 10b which are marked so as to extend at right angles to the core portion 2.

Figure 4:
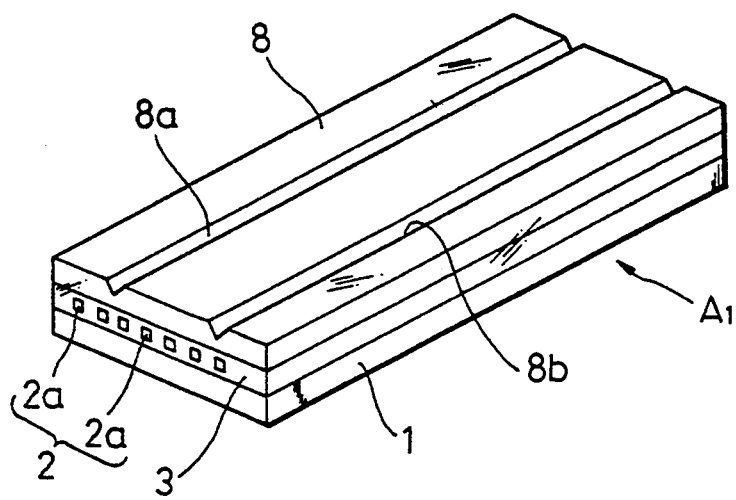
FIG. 4 is a perspective view showing an optical waveguide component body formed of a quartz glass plate (hold-down plate member) engraved with V-grooves (marker portions)

Thereafter, the substrate 1 is cut along the lengthwise direction using the V-grooves 8a and 8b as the positioning references, by means of a dicer or the like, whereby the optical waveguide component bodies A1, such as the one shown in FIG. 4, are cut out individually.

Then, each obtained optical waveguide component body is set in a mold. At this time, pins with a diameter of e.g. about 0.3 mm are previously arranged in the mold, in positions corresponding to the V-grooves 8a and 8b of the component body, the pins are pressed against the grooves 8a and 8b, and the component body is set in the mold.

Further, cores for guide pins with a diameter of e.g. about 0.7 mm are arranged in the mold with use of the aforesaid pins as positioning references, and a molding resin is then filled into the mold.

After the resin is set, the whole resulting structure is taken out of the mold, and the core is removed. Thereupon, the optical waveguide component A is obtained with the V-grooves 8a and 8b filled up, comprising the optical waveguide component body A1 and the resin mold portion A2, which surrounds the component body A1 and has the guide pin holes 9a and 9b opening in each end face thereof, in predetermined positions relative to the optical waveguide core portion 2, as shown in FIG. 2.

Embodiment 2

Figure 7:
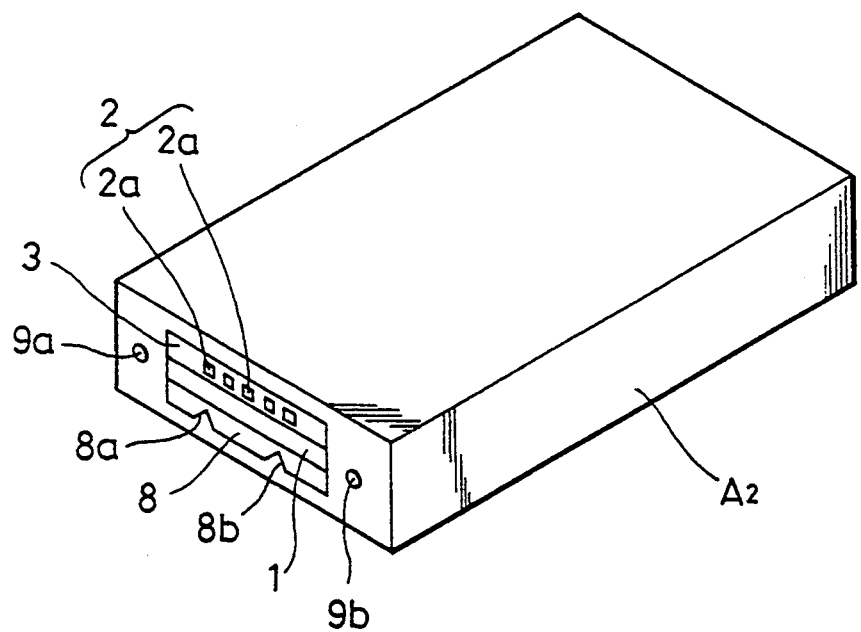
FIG. 7 is a perspective view showing an alternative optical waveguide component according to the invention.

FIG. 7 is a perspective view showing another embodiment. In this case, the quartz glass plate 8 for use as the hold-down plate member is bonded to the back of the substrate 1, the V-grooves 8a and 8b are cut in the plate 8, and the whole structure is resin-molded.

Embodiment 3

Figure 8:
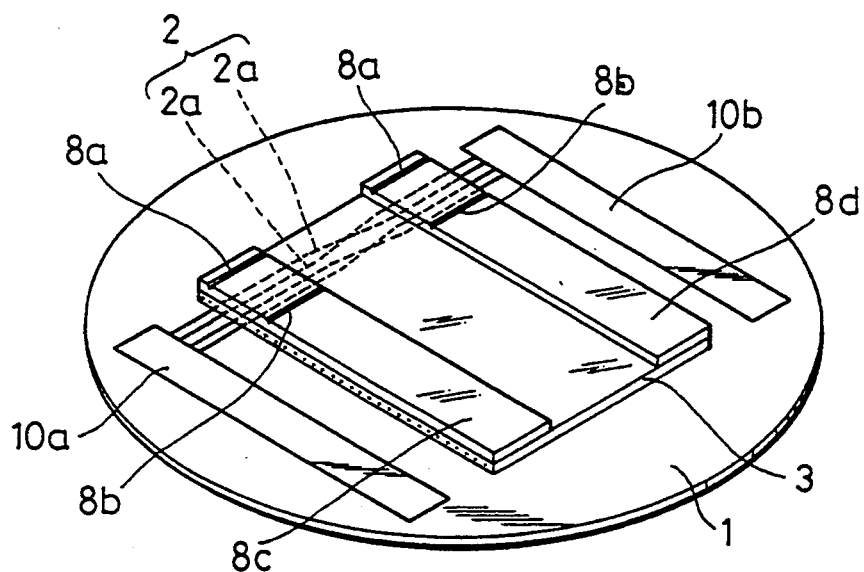
FIG. 8 is a perspective view showing an alternative method for manufacturing the optical waveguide component body of the invention directly on the silicon wafer (substrate)

FIG. 8 shows a state in which the quartz glass plate 8 of Embodiment 1 to be pasted on the cladding portion 3 is divided into two quartz glass plates 8c and 8d, which are separately pasted on the optical waveguide core portion 2 with a space between them in the lengthwise direction of the core portion 2.

In this case, the optical waveguide component can be manufactured in the same manner as in Embodiment 1.

In the case of Embodiment 3, the two quartz glass plates 8c and 8d bite into the molding resin when they are resin-molded in the mold, thereby effectively preventing the optical waveguide component body from being disengaged.

In Embodiments 1 to 3, the quartz glass plate 8, pasted as the hold-down plate member on the surface of the cladding portion 3, is provided to prevent the V-grooves 8a and 8b as the marker portions, which function as the positioning references for the optical waveguide component body set in the mold, from being cut to the depth of the optical waveguide core portion 2, that is, to protect the core portion 2. Therefore, there are no special restrictions on the thickness and material of the hold-down plate member, provided that the press member can achieve this purpose.

Moreover, the hold-down plate member is not limited to a plate such as the one described above, and may be formed by applying water glass to the surface of the cladding portion 3 to a desired thickness or depositing a thick cladding by the conventional flame deposition method, for example.

Although the V-grooves are used as the marker portions in the embodiments described above, the configuration of the marker portions according to the present invention is not limited to this. Alternatively, a plurality of conical recesses may be arranged in the extending direction of the optical waveguide core portion, for example. In short, the marker portions may be any suitable signs which are positioned with respect to the optical waveguide core portion.

Embodiment 4

Figure 9:
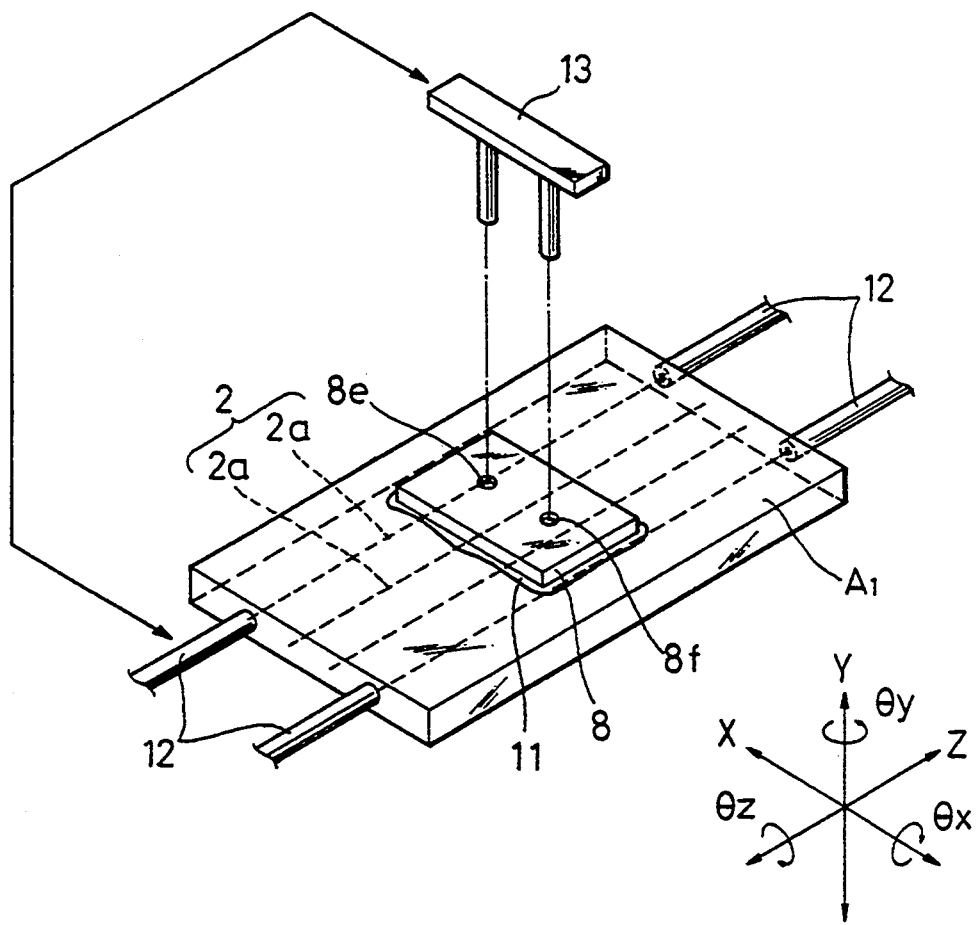
FIG. 9 is a perspective view showing a method for manufacturing the optical waveguide component body of the invention using orifices, positioned with respect to optical fibers, as marker portions.

FIG. 9 is a perspective view showing an alternative manufacturing method.

In FIG. 9, the optical waveguide component body A1 is prepared having the optical waveguide core portion 2 formed in the same manner as in Embodiment 1. This component body A1 is set on a fine adjustment table (not shown) which can finely move in X, Y, Z, θx, θy, and θz directions.

The hold-down plate member, such as the quartz glass plate 8, is pasted on the optical waveguide component body A1 by means of an ultraviolet-curing adhesive 11.

Orifices 8e and 8f are bored as marker portions in the surface of the quartz glass plate 8. As orifice hold-down pins 13, which are in alignment with optical fibers 12 to be aligned, are fitted individually into the holes 8a and 8b, the plate 8 is positioned with respect to the optical fibers 12.

Hereupon, the fine adjustment table is activated. The quartz glass plate 8, which is fixed to the optical waveguide component body A1 by means of the orifice hold-down pins 13, is kept immovable with respect to the optical fibers 12, although it is movable with respect to the component body A1.

After the respective optical axes of the optical fibers 12 are aligned individually with the cores 2a of the optical waveguide core portion 2 in this manner, ultraviolet rays are applied to the ultraviolet-curing adhesive to cure the resin, thereby fixing the quartz glass plate 8 to the optical waveguide component body A1.

Then, the orifice hold-down pins 13 are drawn out, the optical waveguide component body A1, having only the quartz glass plate 8 fixed thereon, is put into the mold, and cores for the guide pins are arranged for resin molding using the orifices 8e and 8f as positioning references. After the molding resin is cured, the core is removed.

As a result, an optical waveguide component is obtained having guide pin holes which are formed with reference to the orifices 8e and 8f as the marker portions which in turn are formed using the optical waveguide core portion 2 as the positioning reference.

Embodiment 5

Figure 10:
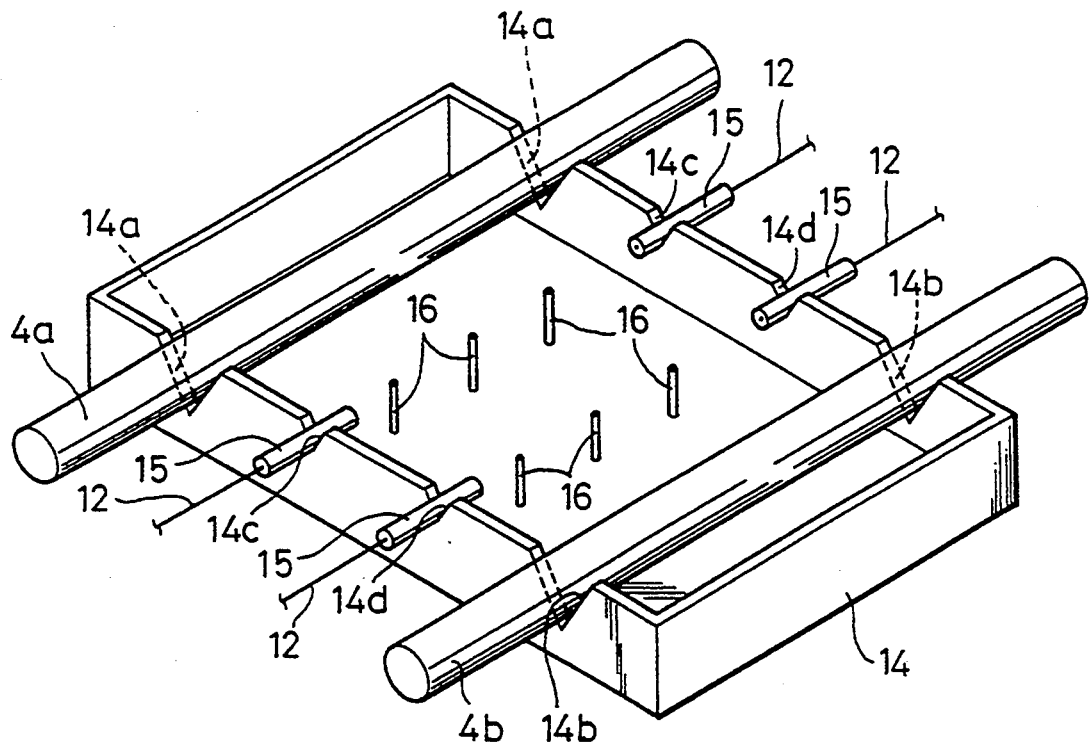
FIG. 10 is a perspective view showing an example of a mold used in another method for manufacturing the optical waveguide component of the invention.
Figure 11:
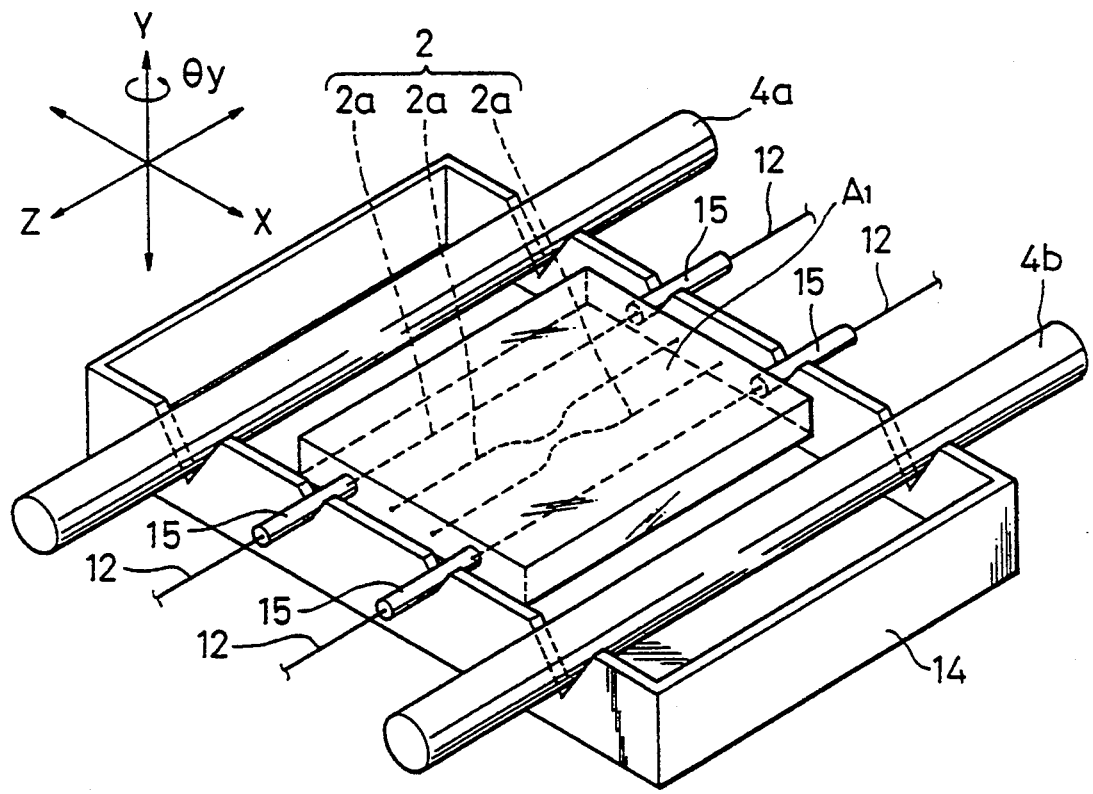
FIG. 11 is a perspective view showing a state in which the optical waveguide component body is held in midair over the mold of FIG. 10.

FIGS. 10 and 11 are perspective views for illustrating a method for manufacturing the optical waveguide component according to the present invention, in which the optical waveguide component body is set directly in the mold without forming the marker portions.

First, the top portions of both side walls of an open-topped mold 14 are notched to form two pairs of large V-grooves 14a and 14b and two pairs of small V-grooves 14c and 14d between the large ones. A pair of guide pins 4a and 4b are fixed to the large V-groove pairs 14a and 14b, respectively, in a suspended manner. Four optical fiber ferrules 15 for optical input and output are fixed individually to the small V-grooves 14c and 14d.

The individual V-grooves are cut so that the respective axes of the guide pins 4a and 4b and the optical fiber ferrules 15 are arranged in predetermined positional relations.

Three or more (six in the drawings) pin rods 16 protrude from the bottom of the mold 14. Each rod 16, like a pointer of a dial gauge, for example, can finely move in the X, Y, Z, and θy directions.

In the mold 14 in this state, the optical waveguide component body A1, having the optical waveguide core portion 2 embedded therein, is placed on the pin rods 16 to be held in midair so that the respective end faces of the cores of the core portion 2 are opposed to the end faces of the optical fiber ferrules 15, as shown in FIG. 11.

Thereafter, the respective axes of the optical fibers 12, set individually in the optical fiber ferrules 15, are aligned with those of their corresponding cores 2a of the core portion 2 by finely adjusting the length of projection of each pin rod 16.

After the alignment is finished, the molding resin is injected into the mold 14 with the optical waveguide component body A1 softly pressed down lest it move.

After the resin is cured, the resulting cast (molded) article is released from the mold 14, and the guide pins 4a and 4b and the optical fiber ferrules 15 are removed.

As a result, the optical waveguide component body A1 is encapsulated in the molding resin, and guide pin holes, positioned with respect to the optical waveguide core portion 2, are formed in the molding resin portion.

What is claimed is:

1. A substantially flat optical waveguide component (A) which has end faces which are to be connected with respective faces of optical fiber connectors by means of guide pins, the optical waveguide component comprising:
   a substantially flat optical waveguide component body ($A_1$) having a cladding portion (3) formed on a substrate (1), and a core portion (2) embedded in the cladding portion (3), said optical waveguide component body ($A_1$) having end faces at said end faces of said optical waveguide component (A);
   a resin mold portion ($A_2$) covering all of the surfaces of said optical waveguide component body ($A_1$) except for said end faces thereof, said resin mold portion ($A_2$) having end faces at said end faces of said optical waveguide component (A); and
   said end faces of said resin mold portion ($A_2$) having guide pin holes (9a, 9b) therein, and wherein said guide pin holes (9a, 9b) are positioned using said optical waveguide core portion (2) as a reference, whereby accurate positioning of said guide pin holes (9a, 9b) relative to said optical waveguide core portion (2) is obtained.

2. The substantially flat optical waveguide component of claim 1, wherein said resin mold portion has elasticity.

3. The substantially flat optical waveguide component of claim 2, further comprising a plate member (8) on a side of said cladding portion (3) which is opposite to said substrate, whereby said cladding portion (3) is arranged between said substrate (1) and said plate member (8), said resin mold portion ($A_2$) covering said plate member (8) except at said end face of said optical waveguide component body ($A_1$).

4. The substantially flat optical waveguide component of claim 3, wherein said plate member (8) is secured to said cladding portion (3) by an adhesive.

5. The substantially flat optical waveguide component of claim 3, wherein at least one marker portion (8a, 8b) is formed in said plate member (8) at a predetermined location relative to said core portion (2).

6. The substantially flat optical waveguide component of claim 5, wherein said guide pin holes (9a, 9b) are positioned at predetermined positions relative to said at least one marker portion (8a, 8b), whereby said guide pin holes are accurately positioned relative to said core portion (2).

7. The substantially flat optical waveguide component of claim 6, wherein said at least one marker portion comprises at least one groove (8a, 8b) in said plate member.

8. The substantially flat optical waveguide component of claim 5, wherein said at least one marker portion comprises at least one groove (8a, 8b) in said plate member.

9. The substantially flat optical waveguide component of claim 5, wherein said at least one marker portion comprises a pair of spaced-apart marker portions (8a, 8b) formed in said plate member at predetermined locations relative to said core portion (2).

10. The substantially flat optical waveguide component of claim 9, wherein said guide pin holes (9a, 9b) are positioned at predetermined positions relative to respective ones of said marker portions, whereby said guide pin holes are accurately positioned relative to said core portion (2).

11. The substantially flat optical waveguide component of claim 10, wherein said marker portions comprise respective grooves in said plate member.

12. The substantially flat optical waveguide component of claim 9, wherein said marker portions comprise respective grooves in said plate member.

13. The substantially flat optical waveguide component of claim 9, wherein said resin mold portion has elasticity.

14. The substantially flat optical waveguide component of claim 5, wherein said resin mold portion has elasticity.

* * * * *